Oct. 12, 1965  L. B. LEONARD  3,211,541
METHOD OF MAKING GLASS ELECTRODE
Filed Jan. 29, 1962
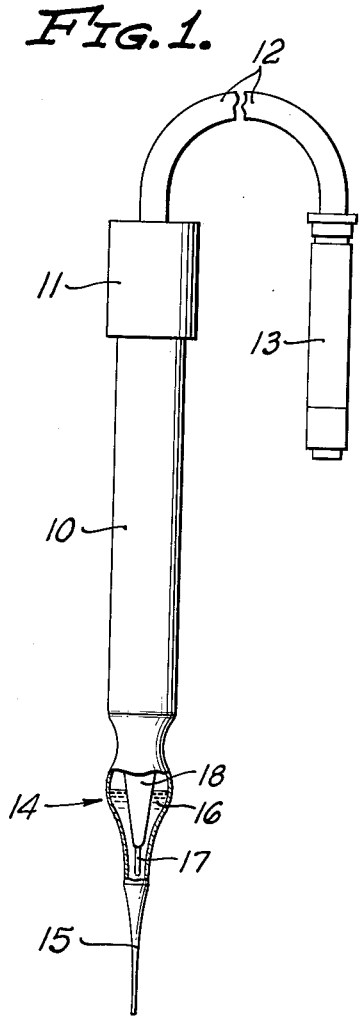
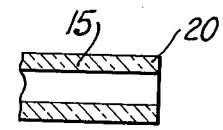
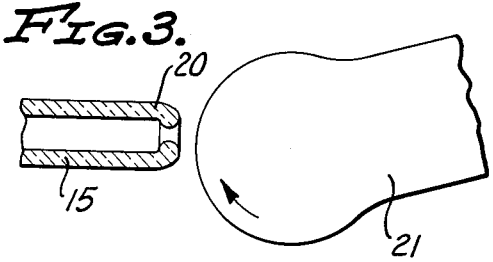
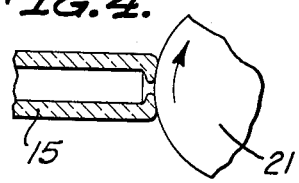
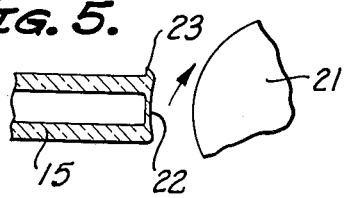
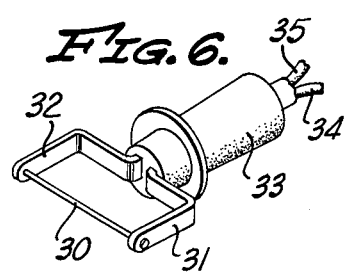
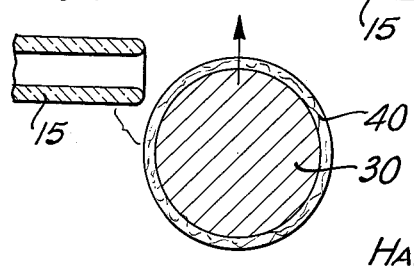
INVENTOR.
LYNN B. LEONARD
BY HIS ATTORNEYS
HARRIS, KIECH, RUSSELL & KERN

United States Patent Office 3,211,541
Patented Oct. 12, 1965

3,211,541
METHOD OF MAKING GLASS ELECTRODE
Lynn B. Leonard, Fullerton, Calif., assignor to Beckman Instruments, Inc., a corporation of California
Filed Jan. 29, 1962, Ser. No. 169,371
3 Claims. (Cl. 65—45)

This invention relates to glass electrodes for ion potential measurements and, in particular, to a new form of glass electrode and methods of making same. The invention is suitable for use with any of the glass compositions used in making glass electrode stems and membranes.

The ordinary glass electrode utilizes a hemispherical sensitive membrane which is in the order of one-half inch diameter and is suitable for most applications. However, there are some situations where the standard electrode cannot be used, e.g., with very small samples, with small sample containers or bodies, and where the electrode is to be inserted into small openings or passages. Such conditions are often encountered in biological studies in which a relatively long and thin needle-like electrode would be extremely useful.

Extremely thin and needle-like glass tubing is not new, having been made in the past for various purposes. The present invention contemplates the use of such tubing in a glass electrode, typically tubing with an outside diameter of ten to fifteen-thousandths of an inch. Accordingly, it is an object of the invention to provide a glass electrode including a needle-like glass tube closed by a glass membrane across the tube end, the membrane being a conductive glass such as is used in conventional glass electrodes.

Another object is to provide such a glass electrode in which the glass membrane is formed from the glass of the tube. A further object is to provide such an electrode in which the glass membrane is formed of a different glass transferred to the tube.

It is an object of the invention to provide new and novel methods of making glass electrodes having a needle-like tubular end closed by a glass membrane.

It is a particular object of the invention to provide a method of making a glass electrode including the steps of positioning adjacent the open end of a needle-like glass tube a punty heated to a temperature above the softening point of the glass tube, maintaining the punty adjacent the open end for a period of time to produce softening of the glass at the end of the tube, and contacting the softened end of the tube with the punty closing the open end with a membrane of glass. A further object is to provide such a method including the steps of carrying a quantity of glass on the punty and contacting the softened end of the tube with the glass on the punty. A further object is to provide such a method including the step of transferring glass from the punty to the end of the tube with the transferred glass forming the membrane closing the tube.

It is a further object to provide a method utilizing a heated wire member as the punty and including the steps of cutting off a portion of the tube with the heated member to provide an open end and to collect some glass on the punty, and then closing the open end by positioning the punty at the open end and subsequently contacting the end to create the glass membrane. Another object is to provide such a method including the step of cutting off a portion of the tube with the heated member and simultaneously forming the membrane across the newly formed end.

The invention also comprises novel details of construction and novel combinations of parts and steps, which will more fully appear in the course of the following description. The drawing merely shows and the description merely describes preferred embodiments of the present invention which are given by way of illustration or example.

In the drawing:
FIG. 1 shows a typical glass electrode incorporating the invention;
FIG. 2 is an enlarged view of an end of a needle-like glass tube;
FIGS. 3, 4 and 5 show successive steps in the formation of a glass membrane closing the end of the tube of FIG. 2;
FIG. 6 is a perspective view of one form of punty suitable for use in practicing the invention; and
FIGS. 7 and 8 show successive steps in an alternative method of the invention.

The glass electrode of FIG. 1 includes a glass stem 10, a cap 11, a cable 12, and a connector 13. The lower end of the stem 10 may be molded to any desired shape as shown at 14, or may be left cylindrical. A needle-like tube 15 is formed at the tip of the stem. The tube is closed as will be described herein, and an electrolyte 16 partially fills the structure. A half cell, such as a silver wire 17 with a silver chloride coating, is supported in a tube 18 and immersed in the electrolyte.

The needle-like tube 15 is formed using conventional tube-drawing techniques. The tube 15 may be formed using the glass of the end of the stem 10 or may be formed from another piece of glass which is sealed to the stem.

The open end 20 of the tube 15 is shown greatly enlarged and in section in FIG. 2. Ordinarily, the tube will be in the range of ten to fifteen thousandths of an inch O.D. with a passage in the range of five to eight thousandths diameter therethrough. A relatively square end may be obtained by breaking off the tip of the drawn tube leaving a clean and sharp end 20.

A punty 21 is heated to a temperature above the softening point of the glass of the tube 15. The punty may be conventional in construction, such as a metal rod, ball or wire, or may be a metal member with an enamel coating, a ceramic member, or a member of a high-melting glass. The punty is heated, as by placing it in a furnace, to a temeprature above the softening point of the glass and preferably near the working point of the glass so as to produce a viscous fluid. Typically, the punty will be heated in the range of 600–800° C. for use with the conventional electrode glasses which soften above 500° C. and are workable at about 700° C. or higher.

The punty is positioned adjacent the end 20 of the tube as shown in FIG. 3. The glass at the tube end is heated and softened by the heat from the punty. Surface tension in the softened glass causes the opening to tend to close, as shown in FIG. 3. If this annulus of soft glass was permitted to fully close, the tube end would be a relatively thick glass plug not suitable for use in ion potential measurements.

However, in the method of the invention, after the tube end has softened, the punty is brought into momentary contact with the tube end, as shown in FIG. 4, producing a flattening of the tube end and creating a thin membrane 22 closing the end. Sometimes a tail or ridge 23 of glass is formed at the parting line between the punty and the glass and the punty may be wiped laterally across the end of the tube to place this tail 23 to one side of the tube end. The membrane 22 will be quite thin, normally in the range of twenty to forty microinches thick.

The fabrication of the sensitive end of the glass electrode is now complete. The electrolyte and half cell are placed in the stem, the cable and cap are attached, and the electrode is ready for use in the conventional manner.

Another form of punty utilizing an electrically heated wire is shown in FIG. 6. A wire 30 is supported between arms 31, 32 carried in a handle 33. Conductors 34, 35 pass through the handle and are connected to the arms 31, 32, respectively. An electric power source connected to the conductors provides a current in the wire 30 to produce the desired heating. The hot wire punty of FIG. 6 may be used in the same manner as the punty 21 described in conjunction with FIGS. 3–5. In a typical instrument, the wire 30 may be platinum 0.025 inch diameter. The current is adjusted to provide the desired operating temperature for the wire.

An alternative method of forming the membrane at the end of the tube 15 is shown in FIGS. 7 and 8. A small amount of glass 40 is carried on the punty, here shown as the wire 30 of the punty of FIG. 6. The punty is heated to a temperature which will maintain the glass 40 soft and which will also cause softening of the end of the tube 15. The punty is positioned adjacent the tube end for a period of time to produce softening of the tube end and is then brought into contact with the softened glass at the tube end. Contact of the punty with the tube produces a membrane 41 of the glass 40 across the tube end with the membrane sealed to the tube. In this method, the glass on the punty may be the same as the glass of the tube or may be of different composition. This method is particularly useful when it is desired to have only the membrane at the end of the tube of low resistance ion sensitive glass. Then the tube 15 can be made of a high-resistance glass such as is used for electrode stems, and the membrane can be made of the ion sensitive glass. Of course, this method may be used with punties of various shapes, such as the punty 21, by carrying a quantity of glass on the punty.

A punty having a member with an "edge," such as the hot wire punty of FIG. 6, may be used for cutting off and sealing of a drawn tube. First the heated member is used to soften and cut off the tip of the drawn tube leaving the substantially squared-off end, similar to that obtained by breaking the tube. This cutting off step ordinarily will result in some glass being adhered to the heated member. The punty is then used to close the end of the tube as described above in conjunction with FIGS. 7 and 8. Alternatively, the tube may be cut and sealed with a membrane in a single operation.

In a specific example of the method of the invention, a tube of conductive glass of the type described in U.S. Patent No. 2,668,143 is sealed to a stem of high-resistance glass using a graded seal comprising a mixture of the two glasses. The tube of conductive glass is heated and drawn into a long needle-like tube having an O.D. of about 0.012 inch and an I.D. of about 0.006 inch. The tip of the drawn tube is broken off. An electrically heated platinum wire about 0.025 inch diameter is coated with some of the conductive glass and is maintained at a temperature which keeps the glass soft but not too fluid. This temperature is in the range of 600 to 800° C.; however, the heating of the wire is adjusted as a function of the condition of the glass rather than as a function of the actual temperature of the wire. The customary care is observed in the heating time and temperature to avoid anything other than incipient devitrification.

The heavy punty is positioned a millimeter from the open end of the tube and is maintained in this position for a few seconds or less. The condition of the end of the tube is observed through a microscope. When softening is observed, the punty is wiped across the tube end producing a membrane of glass closing the tube. The glass electrodes made using this technique have a resistance as low as twenty megohms, which is indeed novel in structures of this small size.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A method of making a glass electrode having a needle-like tubular end, including the steps of:
   applying some glass to a punty heated to a temperature above the softening point of the glass whereby said glass is softened;
   positioning the heated punty adjacent the open end of a needle-like glass tube;
   maintaining the heated punty adjacent the open end for a sufficient period of time to produce softening of the glass at the end of the tube but insufficient to close the end of the tube;
   and contacting the softened end of the tube with the glass on the punty transferring glass from the punty to the tube and making a wiping movement with the punty across said open end so as to thin out and seal the transferred glass onto the end of said tube thereby leaving a glass membrane closing the end of said tube.

2. A method of making a glass electrode having a needle-like tubular end, including the steps of:
   applying some glass to a punty heated to a temperature above the softening point of the glass whereby said glass is softened;
   positioning the heated punty adjacent the open end of a needle-like tube of the same glass;
   maintaining the heated punty adjacent the open end for a sufficient period of time to produce softening of the glass at the end of the tube but insufficient to close the end of the tube;
   and contacting the softened end of the tube with the glass on the punty transferring glass from the punty to the tube and making a wiping movement with the punty across said open end so as to thin out and seal the transferred glass onto the end of said tube thereby leaving a glass membrane closing the end of said tube.

3. A method of making a glass electrode having a needle-like tubular end, including the steps of:
   applying a quanitty of a conductive first glass to a punty heated to a temperature above the softening point of the glass whereby said glass is softened;
   positioning the heated punty adjacent the open end of a needle-like tube of a second glass;
   maintaining the heated punty adjacent the open end for a sufficient period of time to produce softening of the second glass at the end of the tube but insufficient to close the end of the tube;
   and contacting the softened end of the tube with the first glass on the punty transferring some of the first glass from the punty to the tube and making a wiping movement with the punty across said open end so as to thin out and seal the transferred glass onto the end of said tube thereby leaving a glass membrane of said conductive first glass closing the end of said tube.

References Cited by the Examiner

UNITED STATES PATENTS

| | | | |
|---|---|---|---|
| 1,548,108 | 8/25 | Sweet | 65—112 |
| 1,990,768 | 12/35 | Youden | 204—195.1 |
| 2,031,660 | 2/36 | Loepsinger. | |
| 2,117,596 | 5/38 | Bender et al. | 204—195.1 |
| 2,227,757 | 1/41 | Loepsinger. | |
| 2,614,976 | 10/52 | Patnode et al. | 204—195.1 |
| 2,822,646 | 2/58 | Krefft | 65—42 |
| 3,049,118 | 8/62 | Arthur et al. | 204—195.1 |

(Other references on following page)

FOREIGN PATENTS 1,013,055   7/52   France.
1,036,539   8/58   Germany.

OTHER REFERENCES

Central Scientific Catalog J.-300 issued by a Division of Cenco Instrument Corporation. Oct. 20, 1961, page 130.

Charlton: "Australian Dental Journal," June 1956, pp. 174–176.

Dean et al.: "Pro. Iowa Acad. of Sci.," 1934, pp. 127–132, vol. 41.

Harrison: "Jour. of Chemical Society," 1930, pp. 1528–1534.

"Science," Nov. 11, 1932, pp. 441–443.

DONALL H. SYLVESTER, *Primary Examiner.*

JOHN R. SPECK, *Examiner.*